Feb. 12, 1946.  L. B. ROSS  2,394,809
POWER LIFTING APPARATUS
Filed Oct. 7, 1944   2 Sheets-Sheet 1
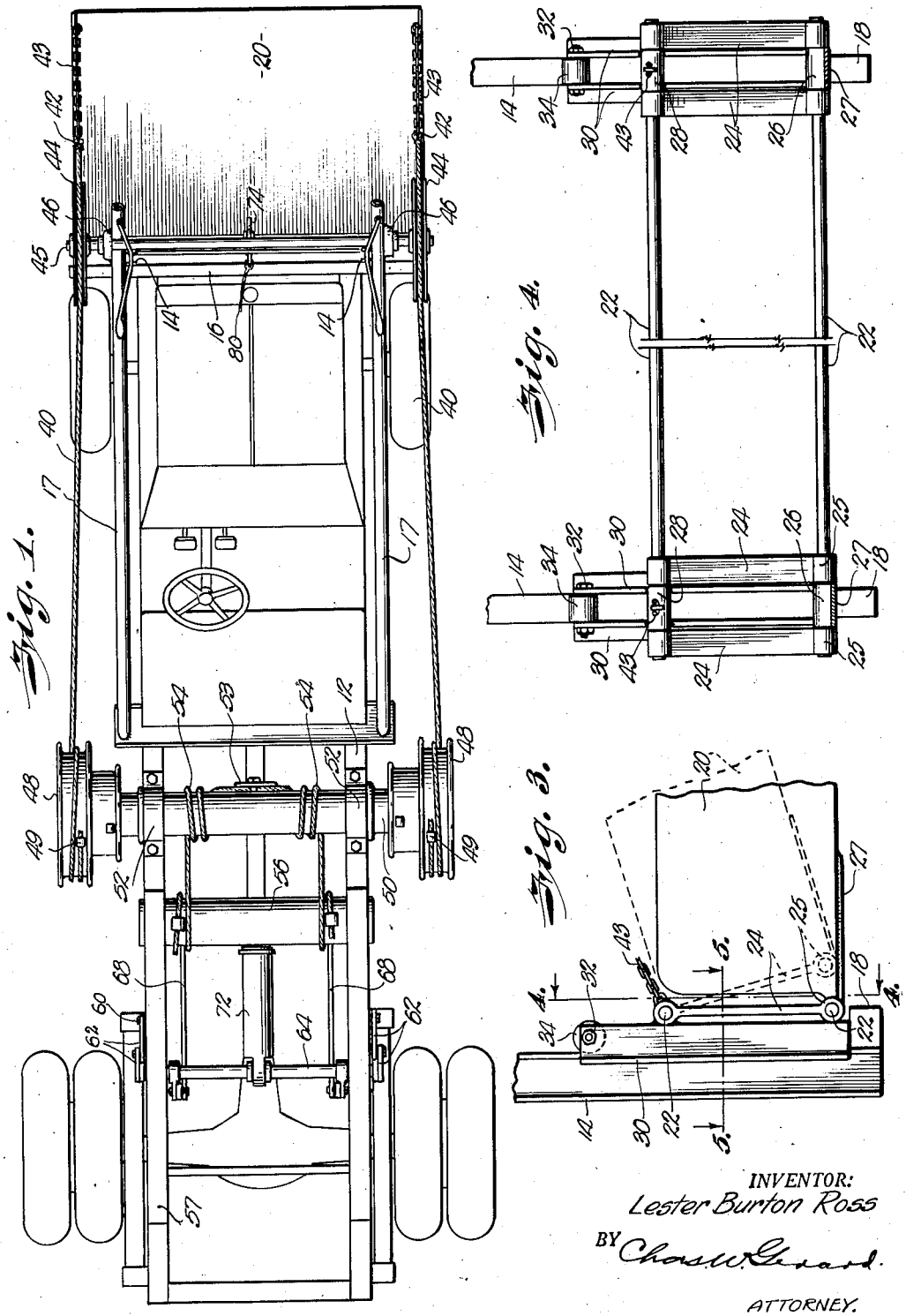
INVENTOR:
Lester Burton Ross
BY
ATTORNEY.

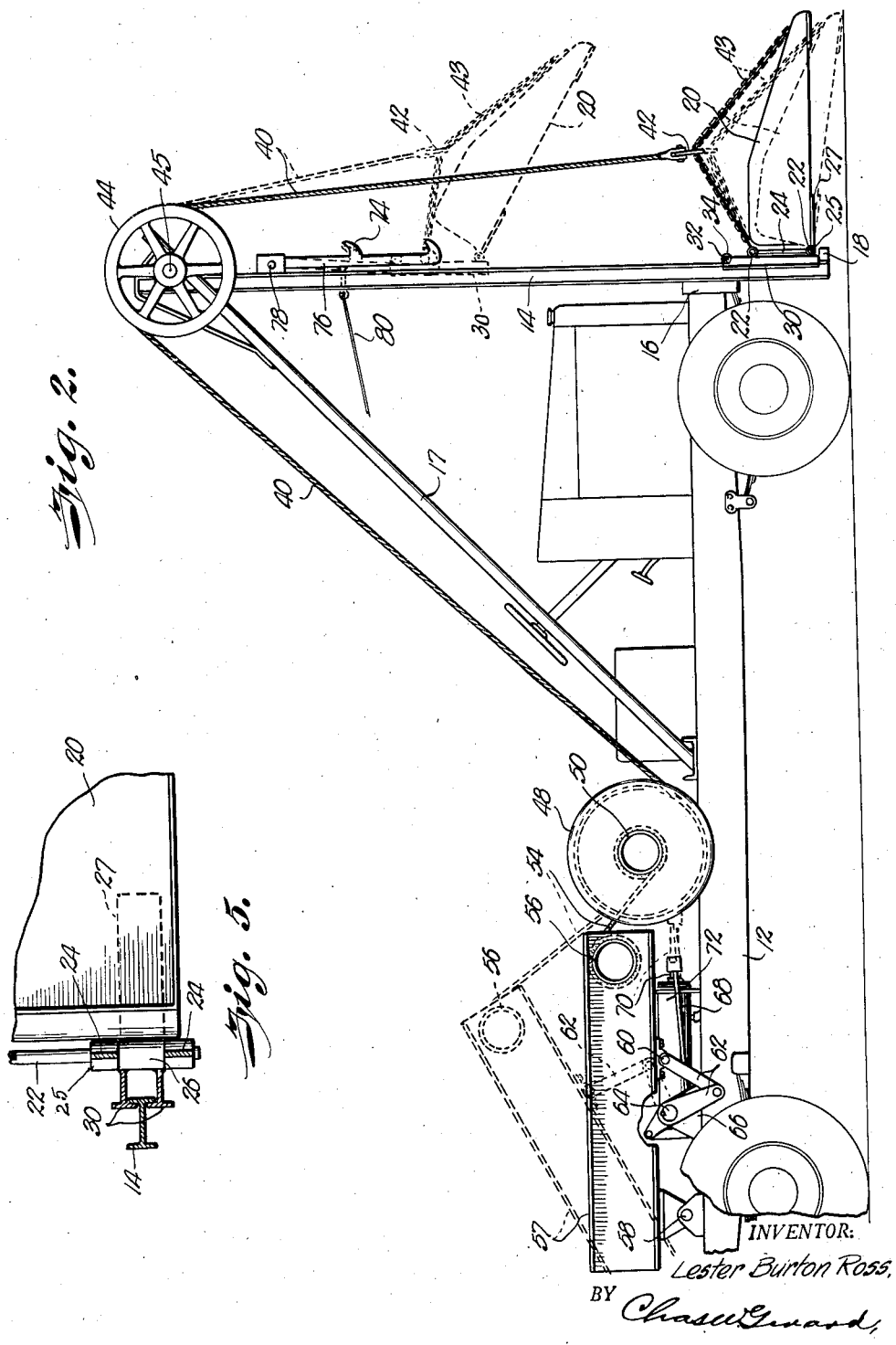

Patented Feb. 12, 1946

2,394,809

UNITED STATES PATENT OFFICE 2,394,809

POWER LIFTING APPARATUS

Lester Burton Ross, Ottawa, Kans.

Application October 7, 1944, Serial No. 557,613

7 Claims. (Cl. 214—113)

The present invention relates to power lifting or loading apparatus, such as power-operated shovel or scoop appliances and the like.

A primary object of the invention is to provide lifting means, such as a shovel or scoop device having improved cable operating connections for raising the shovel or scoop from loading to dumping position, and to facilitate the dumping operation when said shovel or scoop is in its raised position.

Accordingly I have devised a construction in which appropriate means is provided for guiding the shovel or scoop member in its operative movements, together with improved cable transmission means for producing the necessary raising and lowering movements of said member as well as enabling the same to execute its dumping movement.

For accomplishing such purpose the improved construction comprises a vertically movable shovel or scoop member having cable operating connections to a wheel and axle operating means combined with an efficient power-operated movable member so arranged as to produce and control the movements of the cable connections for carrying out the raising and lowering operation of the shovel or scoop member.

It is a further object of the invention to provide a construction of the character described which will be especially adapted and suitable for mounting on trucks or the like, for portable use, as in various farm and road or highway operations.

With the foregoing general objects in view the invention will now be described by reference to the accompanying drawings illustrating one suitable form of construction for embodying my proposed improvements, after which those features and combinations deemed to be novel and patentable will be particularly set forth and claimed.

In the drawings:

Figure 1 is a plan view illustrating a truck construction provided with power lifting apparatus embodying the present improvements;

Figure 2 is a side elevation of the same, with dotted lines representing different operative positions of the parts;

Figure 3 is an enlarged fragmentary side elevation showing the hinge and guide connections between the shovel or scoop member and the vertical guide structure;

Figure 4 is a front elevation of the same, being partly in section on the line 4—4 of Figure 3; and Figure 5 is a detail section, taken on the line 5—5 of Figure 3.

Referring now to the drawings in detail, the improved construction is illustrated therein as comprising a power lift assembly which may be mounted at either end of a truck or tractor frame 12 and made up of a pair of vertical guide frame pieces 14 which may preferably be of H iron type, supported by a cross member or bumper 16 rigidly secured to one end of said frame 12, with the lower ends of the frame pieces 14 at a suitable distance above the ground level and provided with stop projections 18 serving to limit the drop of the shovel or scoop member 20 when it is lowered into loading position, as shown in Figure 2. The frame pieces may be firmly braced by means of inclined frame members 17 supported at the sides of the frame 12.

The scoop or other receptacle 20 operates along guideways provided by the outer flanges of the frame pieces 14, to which it is connected by a double-acting hinge structure comprising upper and lower hinge rods 22 pivotally connected at their ends by means of two pairs of spaced arms or plates 24 having bearing portions 25 for journalling the same on the said rods 22. A pair of sleeves 26 are welded to hinge straps 27 attached to the scoop 20 and these sleeves are also journaled on the lower hinge rod 22, one between each pair of arms 24; and similarly, a sleeve 28 is journaled on the upper rod 22 between the upper ends of each pair of arms 24. The sleeves 28 are attached to guide members 30, such as T-irons, as by fixedly securing said sleeves 28 to the web portions of a pair of such T-irons, which are mounted in sliding engagement with the outer flanges of the frame pieces 14, as illustrated in Figures 3 and 4. The upper ends of each pair of T-irons 30 are also provided with a pin 32 for journalling a roller 34 for rolling engagement with the outer face of said vertical frame pieces 14.

The lifting mechanism comprises suitable cables 40 attached by graple hooks 42 and chains 43 to the forward portion of the scoop 20 and also to the upper hinge rod 22; and these cables are trained over sheave wheels or pulleys 44 at the opposite ends of a shaft 45 journaled in bearing brackets 46 mounted at the upper ends of the frame pieces 17. The cables 40 are further carried around the peripheries of suitable step pulleys or drums 48 and attached thereto as indicated at 49. These drums or step pulleys are secured to the opposite ends of a drum axle 50 which is journaled in bearing members 52 supported on the frame 12.

To this drum axle 50 are also secured, as at 53, the ends of a pair of operating cables 54 which are given a suitable number of turns about said axle, while the other ends of said cables are carried around a cylindrical cross member 56 forming part of a rocking frame 57 (similar to the base frame of a dump-body), one end of which is fulcrumed (as indicated at 58) to the opposite side portions of the frame 12. To the sides of the frame 57 are pivotally connected (as indicated at 60) suitable operating connections 62 which are actuated by a rocker shaft 64 mounted in brackets 66, and in turn actuated by connections 68 from the piston rod 70 of an ordinary type of hydraulic cylinder 72 equipped with conventional operating and control connections—as is the usual practice in apparatus of this character (such control connections being therefore not illustrated in specific detail in the accompanying drawings).

The operation of the apparatus, for the lifting of material by means of the scoop or shovel member, will be readily understood from the drawings in the light of the foregoing, the hydraulic control connections enabling the operator to control the movements of the rocking frame 57 and thereby operating the cable transmission connections for effecting the raising and lowering of said scoop or shovel as required. In this connection it may be pointed out that the double-acting hinge mounting of the shovel member has important advantages in that it provides for a tipping movement of the shovel about the lower hinge rod 22 for enabling a scooping or digging action to be imparted to the shovel in its lowered position, for loading purposes, while being pushed forward by the movement of the truck or other vehicle carrying the apparatus (as indicated by dotted lines in Figure 2). Thereafter, on being raised by the cable connections, the shovel may be swung through horizontal into an oppositely tilted position by pivotal movement upon both the upper and lower hinge rods (as indicated by dotted lines in Figure 3) for effectively retaining the material within the scoop or shovel member. Moreover, as the shovel is operated into and out of dumping position, the guide structure formed by the T-irons 30 and rollers 34 serves as an efficient guiding and tracking means for the raising and lowering movements of the shovel, along the tracks provided by the upright frame members 14.

For supporting the shovel in raised position and assisting in the dumping operation, one or more hook elements 74 are provided, projecting from an arm 76 in position for engagement with the upper hinge rod 22 of the shovel, said arm 76 being suspended from a cross arm 78 which is pivotally mounted on the frame pieces 14. After engagement of the upper hinge rod 22 with one of the hooks 74, the dumping operation is carried out by relaxing of the cables 40 to permit downward swinging movement of the shovel, thereby allowing its contents to slide out freely from the front open end of the shovel.

When empty, the hook is disengaged from latching engagement with the upper hinge rod 22 by means of a suitable pull cord 80, and the shovel then dropped again into its loading position, its lowering movement being limited by engagement with the stop projections 18.

It will therefore be apparent that I have devised a practical and efficient construction and arrangement for the carrying out of the desired objects of my invention, and while I have illustrated and described what I now regard as the preferred form of embodiment of my improvements I desire to reserve the right to such changes or modifications as come within the scope of the appended claims.

What I claim is:

1. Portable power lifting apparatus for tractors and the like, comprising vertical guideways supported by the framework of the tractor, a lifting member mounted for vertically guided movement along said guideways, means providing a double-acting hinge connection between said lifting member and said guideways, and including a lower pivot axis permitting swinging movement of the lifting member into downwardly inclined positions below its normal horizontal position and also an upper pivot axis permitting swinging movement of the lifting member into upwardly inclined positions above said normal horizontal position, and a power-operated cable transmission mechanism provided with connections to said lifting member for raising and lowering the same.

2. Portable power lifting apparatus for tractors and the like, comprising vertical guideways supported by the framework of the tractor, a horizontally projecting lifting member mounted for vertically guided movement along said guideways, double-acting hinge means between said lifting member and said guideways and including a lower pivot axis permitting swinging movement of the lifting member into downwardly inclined positions below its normal horizontal position and also an upper pivot axis mounted for sliding movement along said guideways and supporting said lower pivot axis for outward swinging movement whereby the lifting member is moved into upwardly inclined position above normal horizontal position, and a power-operated cable transmission mechanism provided with connections to said lifting member for raising and lowering the same.

3. Portable power lifting apparatus for tractors and the like, comprising vertical guideways supported by the tractor frame, a material-carrying member mounted for vertically guided movement along said guideways, a double-acting hinge connection between said carrying member and guideways and including a lower pivot axis permitting swinging movement of the lifting member into downwardly inclined positions below its normal horizontal position and also an upper pivot axis mounted for sliding movement along said guideways and supporting said lower pivot axis for outward swinging movement whereby the lifting member is moved into upwardly inclined position above normal horizontal position, power-operated cable transmission means having connections to said carrying member for raising and lowering the same, and stop means at the lower end of said guideways for cooperating with the transmission means in supporting said carrying member in its material receiving or loading position.

4. Portable power lifting apparatus for tractors and the like, comprising vertical guideways supported by the tractor frame, a material-carrying member mounted for vertically guided movement along said guideways, a double-acting hinge connection between said carrying member and guideways and adapted to permit movement of said member into angular positions either above or below horizontal position, power-actuated cable transmission means having connections to said carrying member for raising and lowering the same, and manually controlled latching means at the upper portion of said guideways for cooperating with the transmission means in effecting the tilting operation of said carrying member into material-dumping position.

5. Portable power lifting apparatus for tractors and the like, comprising vertical guideways supported by the tractor frame, a material-carrying member mounted for vertically guided movement along said guideways, a double-acting hinge connection between said carrying member and guideways and acting to permit movement of said member into angular positions either above or below horizontal position, power-operated cable transmission means having connections to said carrying member for raising and lowering the same, and means at both the upper and lower end portions of said guideways for cooperating with said transmission means to effect tilting movement of said carrying member into forwardly inclined position for loading or dumping the same.

6. Portable power lifting apparatus for tractors and the like, comprising vertical guideways supported by the tractor frame, a horizontally projecting lifting member mounted for vertically guided movement along said guideways, double-acting hinge means between said lifting member and said guideways and comprising a lower pivot axis permitting swinging movement of the lifting member into downwardly inclined position below its normal horizontal position and an upper pivot axis movable slidingly along said guideways and supporting said lower pivot axis for outward swinging movement whereby the lifting member is moved into upwardly inclined position above its normal horizontal position, and cable lifting means provided with connections respectively to said upper pivot axis of the hinge means and to the free outer margin of said lifting member for raising and lowering the same.

7. Portable power lifting apparatus for tractors and the like, comprising vertical H-iron guideways supported by the framework of the tractor, a lifting member provided with a double-acting hinge support including T-iron elements mounted in vertically sliding engagement with said guideways, and power operated cable transmission mechanism provided with operative connections to said lifting member for raising and lowering the same.

LESTER BURTON ROSS.